(12) United States Patent
Armatis

(10) Patent No.: US 9,497,174 B2
(45) Date of Patent: *Nov. 15, 2016

(54) SYSTEMS, METHODS, AND COMPUTER-READABLE MEDIA FOR SECURE DIGITAL COMMUNICATIONS AND NETWORKS

(71) Applicant: STT LLC., Austin, TX (US)

(72) Inventor: Matthew Tyrone Armatis, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/848,667

(22) Filed: Sep. 9, 2015

(65) Prior Publication Data

US 2015/0381573 A1    Dec. 31, 2015

Related U.S. Application Data

(63) Continuation of application No. 14/494,007, filed on Sep. 23, 2014, now Pat. No. 9,160,527, which is a continuation of application No. 13/828,760, filed on Mar. 14, 2013, now Pat. No. 8,880,887.

(60) Provisional application No. 61/621,347, filed on Apr. 6, 2012.

(51) Int. Cl.
| | |
|---|---|
| *H04L 29/06* | (2006.01) |
| *H04L 9/08* | (2006.01) |
| *H04L 9/14* | (2006.01) |

(52) U.S. Cl.
CPC ........... *H04L 63/045* (2013.01); *H04L 9/0819* (2013.01); *H04L 9/14* (2013.01); *H04L 63/061* (2013.01); *H04L 63/0442* (2013.01); *H04L 63/0876* (2013.01); *H04L 2209/24* (2013.01)

(58) Field of Classification Search
CPC ............ H04L 63/061; H04L 63/0876; H04L 63/0442; H04L 63/045; H04L 9/14; H04L 9/0819; H04L 2209/24
See application file for complete search history.

(56) References Cited

U.S. PATENT DOCUMENTS

| | | | |
|---|---|---|---|
| 8,509,438 B2* | 8/2013 | McCullough | H04L 9/14 380/259 |
| 8,718,281 B2* | 5/2014 | Mishra | H04L 63/061 380/277 |
| 8,756,656 B1* | 6/2014 | Hartmann | G06F 21/57 713/156 |
| 2013/0054966 A1* | 2/2013 | Clay | H04L 9/3273 713/168 |

* cited by examiner

*Primary Examiner* — Amir Mehrmanesh

(57) ABSTRACT

Provided are system, methods, and computer-readable media for systems, methods, and computer-readable media for secure digital communications and networks. The system provides for secure communication between nodes through the use of a subscription between two nodes based on unique identifiers that are unique to each node, and communication between nodes without a subscription may be blocked. Additionally, secure communications between a node and a remote node are dynamically encrypted using asymmetric and symmetric encryption. The encryption algorithms and key lengths may be changed at each subsequent negotiation between a node and a remote node.

17 Claims, 8 Drawing Sheets

SYSTEMS, METHODS, AND COMPUTER-READABLE MEDIA FOR SECURE DIGITAL COMMUNICATIONS AND NETWORKS

PRIORITY CLAIM

The present application is a continuation of U.S. patent application Ser. No. 14/494,007, filed Sep. 23, 2014, which is a continuation of U.S. patent application Ser. No. 13/828,760, filed Mar. 14, 2013, which claims the benefit of U.S. Provisional Patent Application No. 61/621,347 filed on Apr. 6, 2012. Each of these parent patent applications is hereby incorporated by reference in its entirety.

BACKGROUND OF THE INVENTION

1. Field of the Invention

This invention relates generally to digital networks and, more particularly to securing such networks and providing secure communications between entities of such networks.

2. Description of the Related Art

The Internet has become increasingly complex, leaving many entities that use the Internet and other networks vulnerable to malicious attacks. Business government infrastructure, and military or other organizations around the world rely on static encryption technology to secure their critical communications of important and sensitive information. However, networks and devices that use static encryption are ineffective at creating a secure channel for communication because they may be unable to determine if the static encryption has been compromised or changed. Additionally alternatives such as virtual private networks (VPN) require a large amount of processing power to create and communicate over a secure channel. Moreover, the work required to maintain security and resolve security breaches of networks and devices may be expensive and time-consuming.

SUMMARY OF THE INVENTION

Various embodiments of systems, methods, and computer-readable media for secure digital communications and networks are provided herein. In some embodiments, a computer-implemented method is provided that includes receiving, at a processor, a first packet at a first node of a network and determining, by a processor, whether a subscription exists between the first node and a second node associated with the packet, wherein the subscription includes a predefined relationship between the first node and the second node. The method further includes dropping, by the processor, the packet if no subscription exists and performing, by the processor, an authentication of a connection between the first node and the second node if the subscription exists. The authentication includes sending a unique identifier from the first node to the second node, the unique identifier comprising a node identifier associated with the first node, a fingerprint identifier associated with the first node, and a subscription identifier associated with the subscription. Additionally, the method includes performing, by the processor, a first synchronization of the connection between the first node and the second node if the subscription exists. The first synchronization includes receiving a first request from the second node for a first asymmetric public key and generating a first asymmetric public key and a first asymmetric private key each having a first asymmetric key length using a first encryption algorithm. Additionally, the first synchronization also includes sending the first asymmetric public key to the second node and receiving an encrypted first symmetric key from the second node, the first symmetric key encrypted using the first asymmetric public key and the first symmetric key generated using a second encryption algorithm and decrypting the first encrypted symmetric key to obtain the first symmetric key. Additionally, the computer-implemented method also includes encrypting the first packet using the first symmetric key, sending, over the network, the first packet to the second node, and performing, by the processor, a second synchronization of the connection between the first node and the second node if the subscription exists. The second synchronization includes receiving a second request from the second node for a second asymmetric public key and generating a second asymmetric public key and a second asymmetric private key each having a second asymmetric key length using a third encryption algorithm, the third encryption algorithm different from the first encryption algorithm and the second asymmetric key length different from the first asymmetric key length. The second synchronization also includes sending the second asymmetric public key to the second node and receiving an encrypted second symmetric key from the second node, the second symmetric key encrypted using the first asymmetric public key and the second symmetric key having a second symmetric key length generated using a fourth encryption algorithm, the fourth encryption algorithm different from the second encryption algorithm and the second symmetric key length different from the first symmetric key length. Additionally, the second synchronization also includes decrypting the encrypted second symmetric key to obtain a second symmetric key. Further, the computer-implemented method includes encrypting a data of a second packet using the symmetric key.

In another embodiment, a non-transitory tangible computer-readable storage medium having executable computer code stored thereon for secure communications on a digital network is provided. The computer code includes a set of instructions that causes one or more processors to perform the following operations: receiving, at a processor, a first packet at a first node of a network and determining, by a processor, whether a subscription exists between the first node and a second node associated with the packet, wherein the subscription includes a predefined relationship between the first node and the second node. The computer code further includes a set of instructions that causes one or more processors to perform the following operations: dropping, by the processor, the packet if no subscription exists and performing, by the processor, an authentication of a connection between the first node and the second node if the subscription exists. The authentication includes sending a unique identifier from the first node to the second node, the unique identifier comprising a node identifier associated with the first node, a fingerprint identifier associated with the first node, and a subscription identifier associated with the subscription. Additionally, the computer code also includes a set of instructions that causes one or more processors to perform the following operations: performing, by the processor, a first synchronization of the connection between the first node and the second node if the subscription exists. The first synchronization includes receiving a first request from the second node for a first asymmetric public key and generating a first asymmetric public key and a first asymmetric private key each having a first asymmetric key length using a first encryption algorithm. Additionally, the first synchronization also includes sending the first asymmetric public key to the second node and receiving an encrypted first symmetric key from the second node, the first symmetric key encrypted using the first asymmetric public key and the first symmetric key generated using a second encryption algorithm and decrypting the first encrypted symmetric key to obtain the first symmetric key. Additionally, the computer code also includes a set of instructions that causes one or more processors to perform the following operations: encrypting the first packet using the first symmetric key, sending, over the network, the first packet to the second node, and performing, by the processor, a second synchronization of the connection between the first node and the second node if the subscription exists. The second synchronization includes receiving a second request from the second node for a second asymmetric public key and generating a second asymmetric public key and a second asymmetric private key each having a second asymmetric key length using a third encryption algorithm, the third encryption algorithm different from the first encryption algorithm and the second asymmetric key length different from the first asymmetric key length. The second synchronization also includes sending the second asymmetric public key to the second node and receiving an encrypted second symmetric key from the second node, the second symmetric key encrypted using the first asymmetric public key and the second symmetric key having a second symmetric key length generated using a fourth encryption algorithm, the fourth encryption algorithm different from the second encryption algorithm and the second symmetric key length different from the first symmetric key length. Additionally, the second synchronization also includes decrypting the encrypted second symmetric key to obtain a second symmetric key. Further, the computer code also includes a set of instructions that causes one or more processors to perform the following operations: encrypting a data of a second packet using the symmetric key.

In another embodiment, a system for secure communications on a digital network is provided. The system includes a management server coupled to the network, wherein the management server includes a first non-transitory machine readable memory, the memory comprising a plurality of subscriptions, a plurality of node identifiers and a plurality of encryption algorithms and a plurality of nodes coupled to a network. Each node includes a fingerprint identifier associated with the node, a node identifier of the plurality of node identifiers that is associated with the node, and a subscription of the plurality of subscriptions, the subscription defining a relationship between a node and another node to enable secure communications between the nodes. Each node further includes a processor and a second tangible non-transitory machine readable memory having computer code stored thereon. The computer code includes a set of instructions that, when executed by the processor, cause the processor to perform the following operations: performing, by the processor, a synchronization of the connection between the first node and the second node. The synchronization includes receiving a request from the second node for an asymmetric public key and generating an asymmetric public key and an asymmetric private key each having a first asymmetric key length using a selected asymmetric encryption algorithm. The synchronization also includes sending the asymmetric public key to the second node and receiving an encrypted symmetric key from the second node, the symmetric key encrypted using the public key and the symmetric key generated using a selected symmetric encryption algorithm. Additionally, the synchronization includes decrypting the encrypted symmetric key to obtain a symmetric key. The computer code also includes a set of instructions that causes one or more processors to perform the following operations: encrypting data of the packet using the symmetric key.

BRIEF DESCRIPTION DRAWINGS

Figure 1:
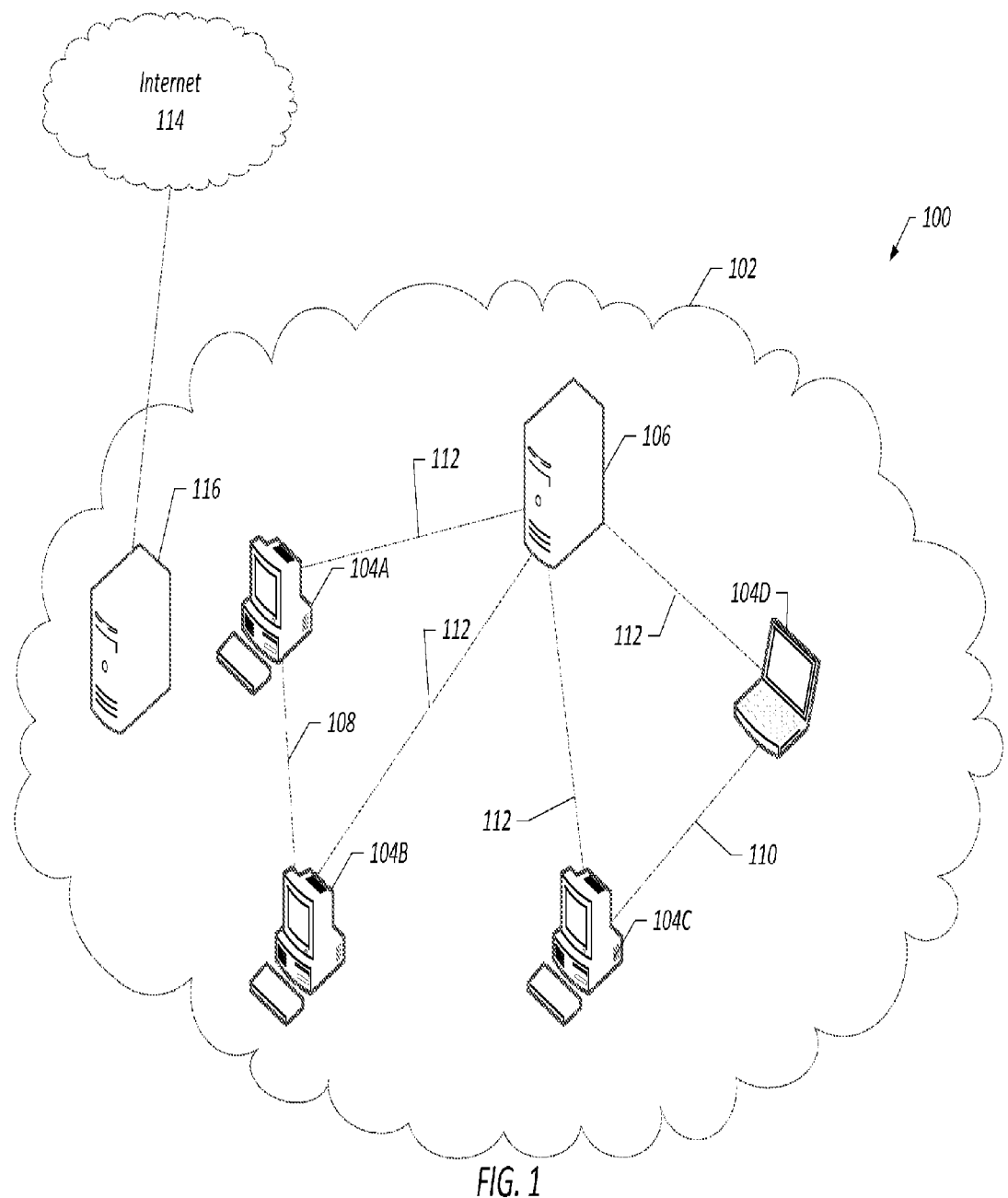
FIG. 1 is a schematic diagram of a secure network system in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for secure digital communications and networks. A system may include one or more nodes and a management server. The system provides for secure communication between nodes through the use of a subscription between two nodes based on unique identifiers that are unique to each node, and communication between nodes without a subscription may be blocked. The unique identifier for a node may include a node identifier, a fingerprint identifier based on a hardware factor, and a subscription identifier. Additionally, a subscription may also define various secure communication parameters for communication between two nodes. Inbound and outbound communications (e.g., packets) are logged, and the packets are dropped if no subscription exists. If a subscription exists, the packet is further processed.

Secure communications between a node and a remote node are dynamically encrypted using asymmetric and symmetric encryption. If a subscription exists between a node and a remote node, a connection between the nodes is then authenticated and synchronized (negotiated). The synchronization may include the generation of asymmetric keys (e.g., a public key and a private key) for exchanging a symmetric key. The symmetric key is used for encrypting secure communications between a node and a remote node. Additionally, the encryption algorithm used for generating the asymmetric keys, the asymmetric key length, the encryption algorithm used for generating the symmetric key, the symmetric key length, or any combination thereof may be different in each subsequent negotiation. Each node of a connection may request renegotiation based on renegotiation criteria, such as a time period, a number of packets received or sent, the amount of data received or sent, or other criteria.

FIG. 1 is a diagram that illustrates secure network system 100 having a network 102 in accordance with an embodiment of the present invention. The secure network system 100 may include multiple nodes 104 (e.g., computers) and, in some embodiments, a management server 106. It should be appreciated that, in some embodiments the management server 106 may be omitted. The nodes 104 may include, for example, desktop computers 104A, 104B, and 104C, and a laptop computer 104D. Various other computers, such as tablet computer, smartphones, and other types of computers, may be included in the system 100 and may communicate via the network 102 using the techniques described herein. Moreover, although FIG. 1 illustrates one node 104 for each computer of the secure network system 100, in some embodiments a computer may be defined as multiple nodes.

The network 102 may implement any suitable technology, standards, and protocols that are suitable for use with the secure communications techniques described herein. For example, in some embodiments the network 102 may use Ethernet, Wireless Fidelity (Wi-Fi), (e.g., IEEE 802.11 standards), Internet Protocol (IP), Transmission Control Protocol (TCP), NetBios, Internetwork Packet Exchange (IPX), or other suitable technologies, standards, and protocols. Additionally, it should be appreciated that the nodes 104 may include suitable network interface hardware for communication over the network 102.

The secure network system 100 provides for secure communication between nodes 104 through the use of a subscription between two nodes based on unique identifiers that are unique to each node. As used herein, the term "subscription" refers to a defined relationship between two nodes wherein each node retains information to provide identifying digital communications. A subscription may also define various secure communication parameters for communication between two nodes, such as the number of encryption algorithms used in communication, the types of encryption algorithms used in communications, the key lengths used in communications, the key length increments used in communications, renegotiation criteria and the like.

As described below, each node 104 and the management server 106 may include a secure communications program that enables the secure network system 100 and secure communications between nodes. The subscriptions may be defined between each node based on unique identifiers for each node. The management server 106 may enable management of the secure network system 100, such as by providing for definitions of subscriptions (identified by subscription identifiers), generation of node identifiers, removal of subscriptions, removal of node identifiers, and so on. For example, a subscription 108 may be defined between nodes 104A and 104C. Thus, node 104A may send and receive secure communications to and from node 104B, and node 104B may send and receive secure communications to and from node 104A. As described further below, the inbound and outbound communications between node 104A and node 104B are secured using encryption algorithms and keys. Moreover, because node 104A does not have subscriptions defined with regards to nodes 104C and 104D, any inbound or outbound communications between node 104A and node 104C or node 104D are blocked, as described below.

Similarly, as shown in FIG. 1, a subscription 110 may be defined between nodes 104C and nodes 104D. Here again, the subscription 110 enables nodes 104C and node 104D to send and receive secure communications between each other. However, any communications between node 104C and node 104A or node 104B are blocked because there is no defined subscription between these nodes. Additionally, any communications between nodes 104D and node 104A or node 104B is blocked because there is no defined subscription between these nodes. As described above, in some embodiments a computer may be defined as multiple nodes. Thus, a computer may be defined as a first node having one or more subscriptions to other nodes of the system 100 and as a second node having one or more different subscriptions to other nodes of the system 100.

To enable configuration of the secure network system 100, a subscription 112 may be defined between each node 104 and the management server 106. In some embodiments, these subscriptions may be defined during configuration of the management server 106 and creation of the nodes 104. The subscription 112 between each node 104 and the management server 106 may enable for various configuration information to be securely communicated between each node and the management server 106. Moreover, the management server 106 may access data stored on each node, such as logs, identifiers, subscriptions, and other data. In some embodiments, the management server 106 may provide for subdividing the network system 100 into subsystems having subsets of nodes.

In some embodiments, the central management server 106 may be used to define and store subscriptions, identifiers, and other information suitable for management of the system 100. The central management server 106 may include suitable data structures for storage of such data, such as one or more databases. In some embodiments, the unique identifier for each node may include three identifiers: a node identifier generated by the management server 106, a fingerprint identifier generated at the node using a hardware factor, and a subscription identifier that pairs the node to another node. The node identifier may be created by the management server 106, either automatically or manually (e.g., with input from an administrator). As mentioned above, a computer of the system 100 may be assigned one, two, or more node identifiers. The fingerprint identifier may be unique to the hardware of each node based on a hardware factor. As will be appreciated, the hardware factor may identify a unique hardware configuration of a node (e.g., a unique combination of a processor, memory, motherboard, hard drive, graphics processing unit (GPU), other hardware, or combination thereof). The unique fingerprint identifier for a node is thus generated based on the unique hardware factor. The subscription identifier identifies a subscription between a node and another node. Thus, it should be appreciated that the unique identifiers described above are independent of the addressing used by the network 102 (e.g., IP addresses). Thus, the secure communications described herein may work in combination with typical networking and transport protocols, such as TCP/IP.

In some embodiments, the system 100 may have the capability of providing access to other networks, such as the Internet 114. In such embodiments, another node may act as a gateway 116 to the Internet 114 or any other network. However, in accordance with the secure communications described herein, a node 104 of the system 100 may only communicate with the gateway 116 via a subscription. Accordingly, a node 104 may not have access to the gateway 116 and, thus, the Internet 114, unless a subscription is defined between the node and the gateway.

Additionally, in some embodiments, secure communications between the nodes 104 (and the management server 106) of the system 100 may use a specific message structure. Thus, although the secure communications are dynamically encrypted according to the techniques described below, the specific message structure may provide another technique for securing communications between nodes, as a receiving node will be unable to unscramble and read a message having the specific message structure unless the receiving node implements the secure communications described herein.

Figure 2:
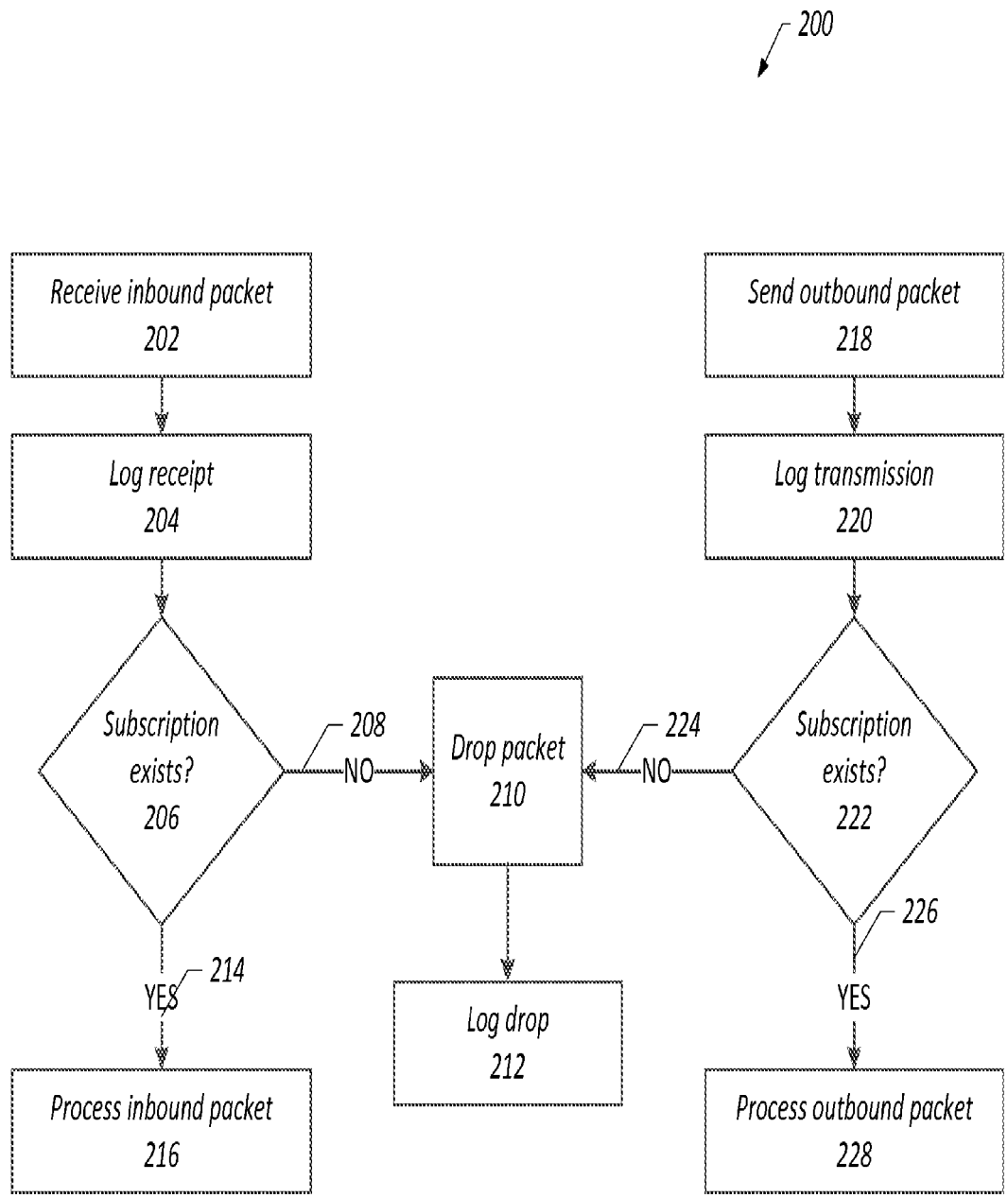
FIG. 2 is a block diagram of a process summarizing filtering of inbound and outbound communications at a node in accordance with an embodiment of the present invention.

FIG. 2 depicts a process 200 summanzmg filtering of inbound and outbound communications (e.g., packets) at a node in accordance with an embodiment of the present invention. Some or all steps of the process 200 may be implemented as executable computer code stored on a non-transitory tangible computer-readable storage medium and executed by one or more processors of a special-purpose machine, e.g., a computer programmed to execute the code. As described below, the filtering of inbound and outbound communications may be performed at the interface between the data link layer (layer 2) and the network layer (layer 3) of the Open Systems Interconnection model. For example, in some embodiments the filtering may be implemented using the Network Driver Interface Specification (NDIS) application programming interface (API). Initially, an inbound packet send to a node may be received (block 202). The receipt of the inbound packet may be logged (block 204). The log data may include, for example, the transmitting source of the inbound packet, the date and time of receipt, the size of the packet, the transmission protocol, the contents of the packet or any other data or combination thereof. Further, in some embodiments the logs are periodically sent to a management server for archiving and analysis.

Next, the existence of a subscription between the packet ongm and the node is determined (decision block 206). As described above, a subscription is defined between two nodes to enable secure communication between the nodes. If no subscription exists (line 208), the packet is dropped (block 210), and the drop may be logged (block 212). In such instances, no communication is sent to the originator of the packet that the packet was received, dropped, or otherwise acknowledged. If a subscription exists (line 214), the packet is processed (block 216). As described further below, the processing of an inbound packet may include decrypting the packet using keys generating during the negotiation between nodes (e.g., between the originator of the packet and the receiving node) having a defined subscription.

FIG. 2 also depicts processing of an outbound packet from a node to destination. Initially, the outbound packet is sent from the node (block 218). The transmission of the outbound packet may be logged (block 220). The log data may include, for example, the destination of the outbound packet, the date and time of receipt, the size of the packet, the transmission protocol, the contents of the packet or any other data or combination thereof. As mentioned above, in some embodiments the logs are periodically sent to a management server for archiving and analysis. Next, the existence of a subscription between the packet destination and the node is determined (decision block 222). If no subscription exists (line 224), the packet is dropped (block 210), and the drop may be logged (block 212). In such instances, no communication is sent to the originator of the packet that the packet was received, dropped, or otherwise acknowledged. If a subscription exists (line 226) between the node and the destination, the packet is processed (block 212). As described further below, the processing may include encrypting the packet using keys generating during the negotiation between nodes (e.g., between the sending node and the destination of the packet) having a defined subscription.

Figure 3:
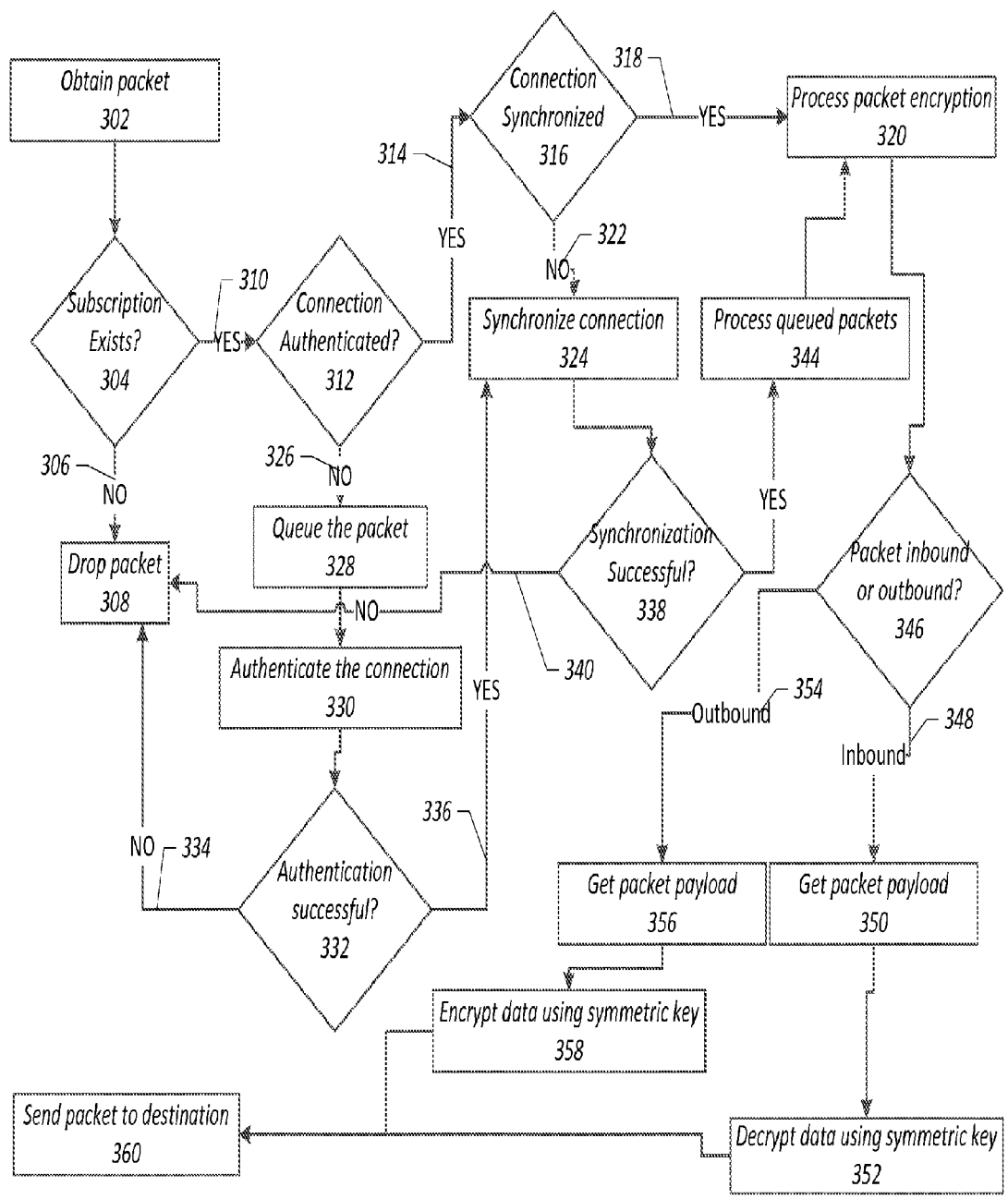
FIG. 3 is a block diagram a process for secure communication in a secure network system in accordance with an embodiment of the present invention.

FIG. 3 depicts a process 300 illustrating the processing of a secure communication (e.g., transmission of an inbound or outbound packet) of a secure network system in accordance with an embodiment of the present invention. Some or all steps of the process 300 may be implemented as executable computer code stored on a non-transitory tangible computer-readable storage medium and executed by one or more processors of a special-purpose machine, e.g., a computer programmed to execute the code. The process 300 describes identifying a subscription between nodes, determining if a connection between nodes is authenticated, and determination if a connection between nodes is synchronized. Initially, an inbound or outbound packet is obtained (block 302) for receipt at a node (from a remote node) or for transmission from a node (to a remote node). The existence of a subscription for further processing of the packet is determined (decision block 304). As described above, a subscription may be defined between nodes of a secure network system. The subscriptions defined for a node may be accessed to determine if a subscription exists between the nodes attempting the secure communication (e.g., the transmission of a packet). If no subscription exists (line 306), the packet is dropped (block 308) and no response is sent to the originator of the packet.

If a subscription exists that enables processing of the packet (line 310), then the connection is tested to determine if the connection is authenticated (decision block 312). The authentication includes making a request to a remote node and sending identifying information about the node (e.g., a unique identifier that may include the node identifier, the fingerprint identifier, and the subscription identifier). The authentication may also include recelvmg identifying information (e.g., a unique identifier that may include the node identifier, the fingerprint identifier, and the subscription identifier) from the remote node and determining that the received information matches the information for the subscription with the remote node.

If the connection is authenticated (line 314), the connection is evaluated to determine if the connection is synchronized (block 316). The synchronization (also referred to as "negotiation") may include exchanging identifying information and, as described below, generating the keys used for secure communications between nodes. If the connection is determined to be synchronized (line 318), the packet encryption is processed (block 320), such as by encryption or decrypting the packet data as described further below. If the connection is not synchronized (line 322), the connection may be synchronized (block 324).

If the connection is not authenticated (line 326), the packet may be queued (block 328) and the connection may be authenticated (block 330). The authentication attempt may be evaluated to determine if the authentication is successful (decision block 332). If the authentication is not successful (line 334), the packet is dropped (block 308). If the authentication is successful and the connection is authenticated (line 336), the connection may then be synchronized (block 324). The synchronization attempt may be evaluated to determine if the synchronization is successful (decision block 338). If the synchronization is not successful (line 340), the packet is dropped (block 308). If the synchronization is successful (line 342), any queued packets are processed (block 344). As mentioned above, the packet encryption is then processed (block 320).

If a packet is cleared for processing, the packet is evaluated to determine if the packet is inbound, e.g., received at the node, or outbound, e.g., sent from the node (decision block 346). If the packet is inbound (line 348), then the inbound packet payload (i.e., the data portion of the packet) is obtained (block 350) and decrypted using a symmetric key (block 352) that was obtained during the synchronization process. If the packet is outbound (line 354), then the outbound packet payload is obtained (block 356) and then encrypted using a symmetric key that was obtained during synchronization (block 358). The obtaining of the symmetric key is described further below in the discussion of FIGS. 4-6. After the packet data has been decrypted or encrypted the packet is then processed according to the information associate with the packet (block 360). For example, if the packet is an outbound packet, the packet is provided to the appropriate layer for sending from the node to the remote node. If the packet is an inbound packet, the packet is provided to the appropriate layer for further processing by the node.

Figure 4:
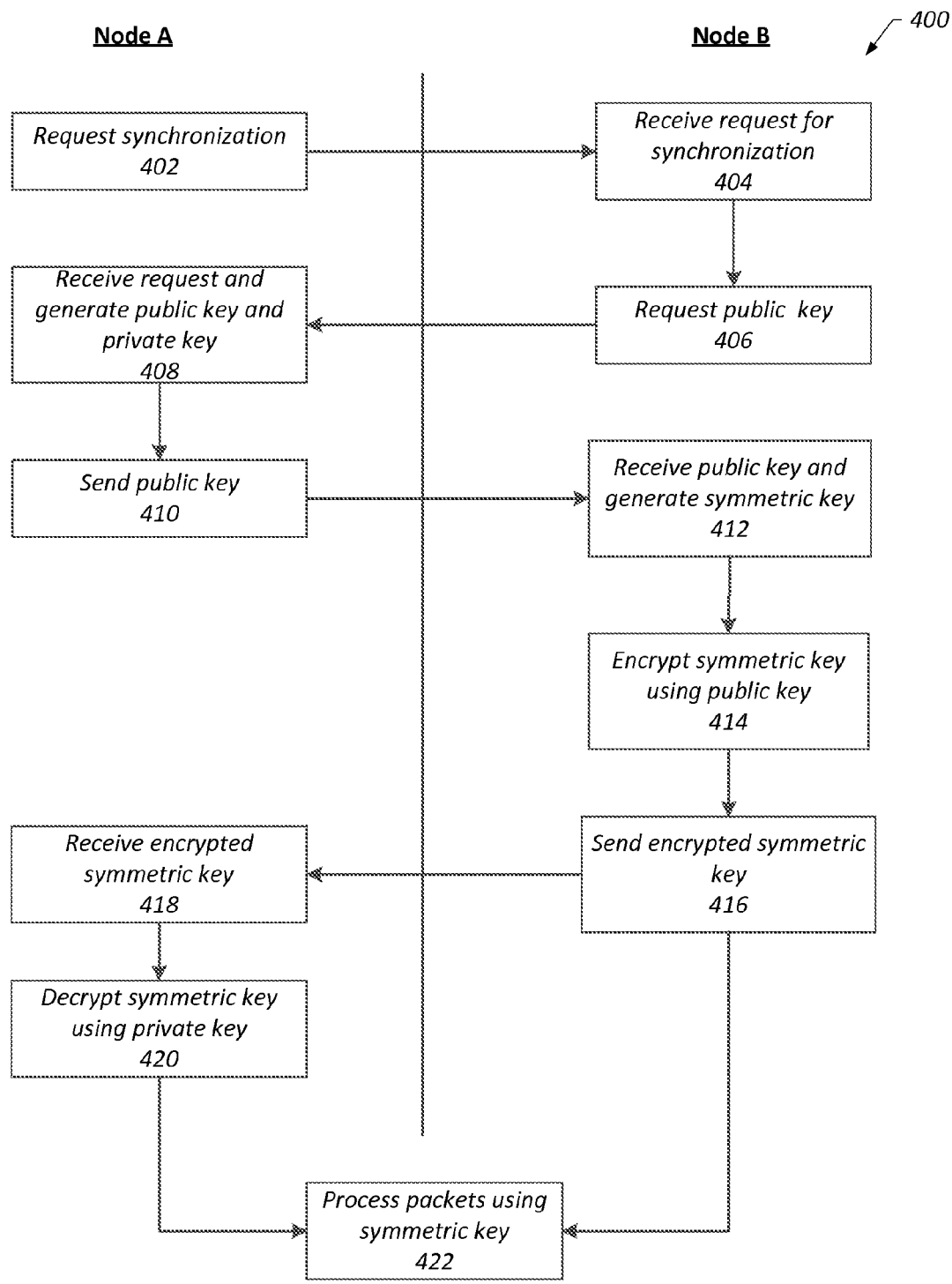
FIG. 4 is a block diagram that depicts a process for synchronization of a connection between nodes in accordance with an embodiment of the present invention.
Figure 5:
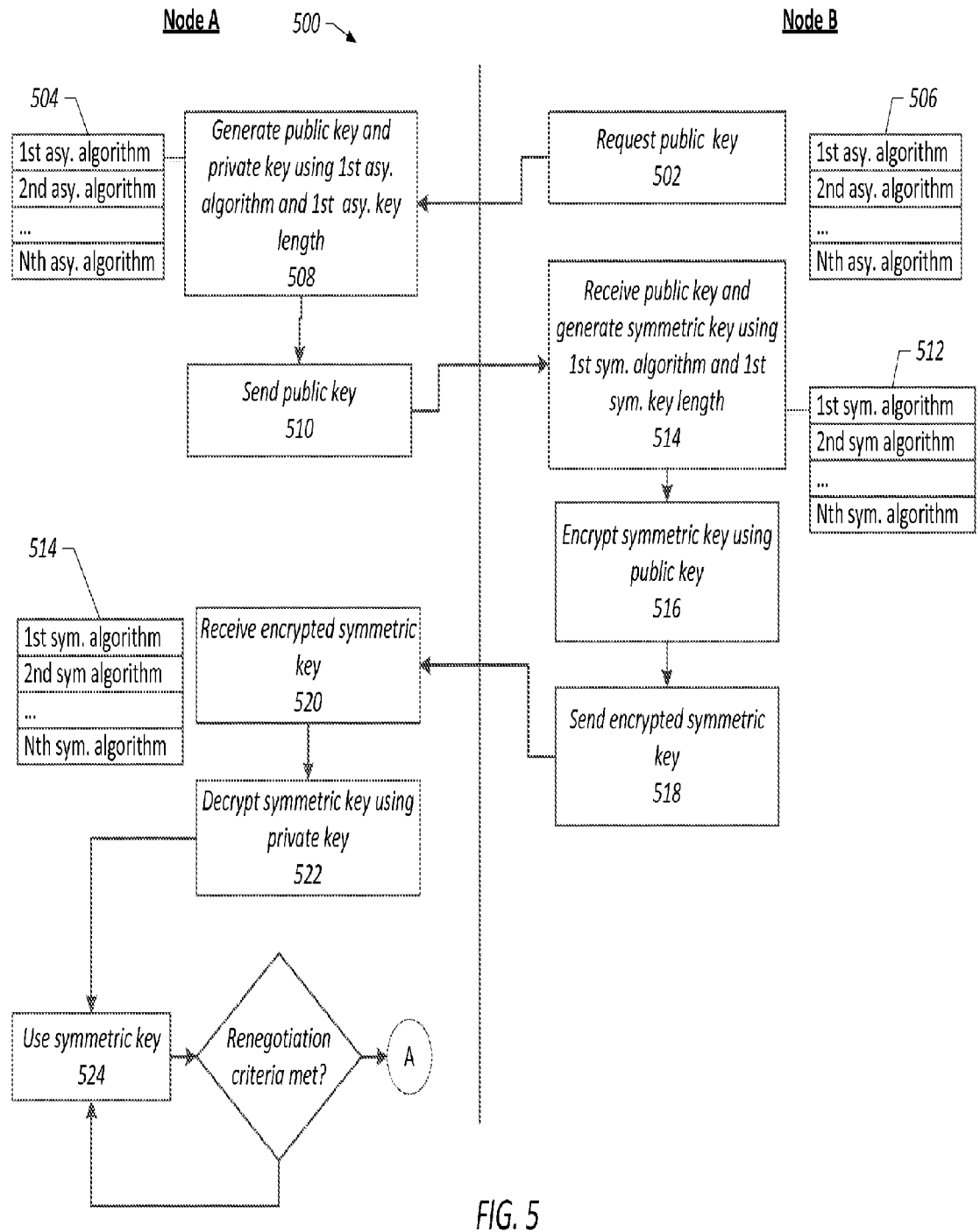
FIGS. 5 and 6 are block diagrams that depict processes for a sequence of synchronizations of a connection between nodes in accordance with an embodiment of the present invention.
Figure 6:
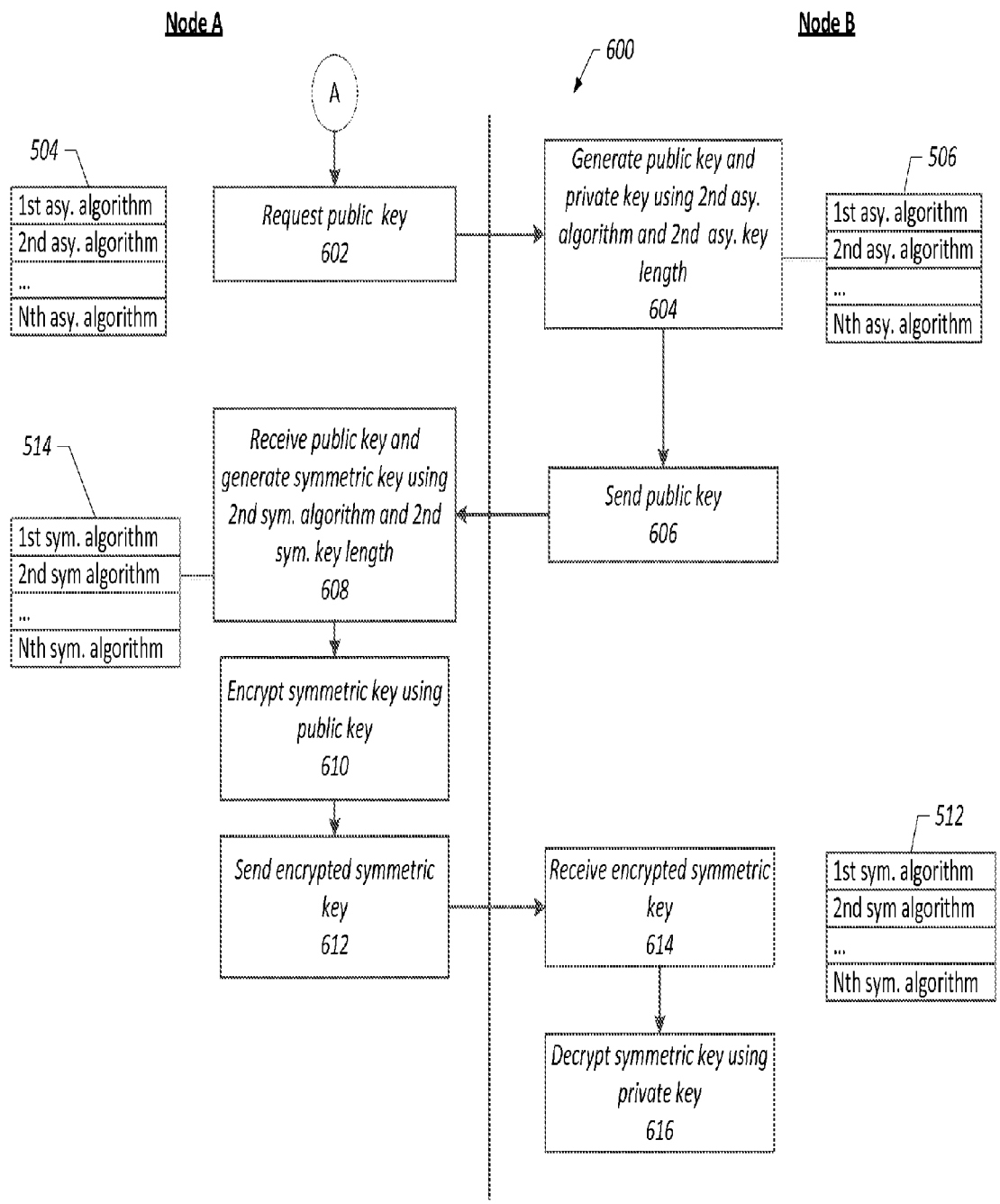

As described above, secure communications between nodes having a defined subscription are dynamically encrypted (for outbound packets) and decrypted (for inbound packets). FIGS. 4-6 illustrate further details of the synchronization (also referred to as or as a part of "negotiation") between nodes to generate keys for secure communication according to an embodiment of the present invention. The key generation may be performed whenever a connection is negotiated between two nodes, and the generated keys may be used until the connection is renegotiated. The dynamic encryption may use any number of suitable encryption algorithms. Such encryption algorithms may include, for example, RSA, DES, Triple DES, RC2, AES, and ASBE.

FIG. 4 depicts a process 400 for synchronization of a connection between nodes in accordance with an embodiment of the present invention. Some or all steps of the process 400 may be implemented as executable computer code stored on a non-transitory tangible computer-readable storage medium and executed by one or more processors of a special-purpose machine, e.g., a computer programmed to execute the code. The process is described with reference to node A and node B (e.g., remote node relative to node A) of a secure network system implementing the present invention. Initially, as described above, a request for synchronization is sent (block 402), e.g., from node A to node B. As described above, the synchronization request may be sent in response to node A negotiating a connection with node B. For example, the synchronization request may be made in response to an inbound packet (e.g., node A receiving a packet from node B) or in response to an outbound packet (node A sending a packet to node B). In the present example, node A is initiating the negotiating the connection to node B.

Next, node B receives the request for synchronization (block 404). In response, node B may request a public key from node A (block 406). Node A may receive the request for a public key and generate a public key and private key (also referred to as asymmetric keys) (block 408) according to an algorithm and then may transmit the public key to node B (block 410). Node B receives the public key and generates a symmetric key (block 412). The symmetric key is then encrypted using the public key (block 414), and the encrypted symmetric key is sent to node B (block 416).

As shown in FIG. 4, node A receives the encrypted symmetric key (block 418) and decrypts the symmetric key using the private key (block 420) and the appropriate algorithm. After node A decrypts the symmetric key, the symmetric key is available for node A and node B to process packets (block 422). For example, node A may encrypt a packet for transmission to node B using the symmetric key, and node B may decrypt the packet received from node A using the symmetric key. Similarly, as described above in FIG. 3, packets may be queued during negotiation of the connection and generation of the keys. Node A or node B may then encrypt or decrypt outbound or inbound queued packets accordingly.

The synchronization (negotiation) process described above and illustrated in FIG. 4 may occur at every negotiation of the connection between nodes of the secure network system described herein. Either node of a connection may initiate a negotiation. In such embodiments, each node may have different renegotiation criteria for renegotiation of a connection. The renegotiation criteria may be defined on a per-node basis or a per-subscription basis. The renegotiation criteria may be based on a time limit (e.g., 5 seconds or greater, 10 seconds or greater, 15 seconds or greater, 20 seconds or greater, 30 seconds or greater, 1 minute or greater, and so on), the number of packets sent or received, the amount of data sent or received, or any combination thereof. For example, node A referred to in FIG. 4 may be configured to renegotiate a connection every 30 seconds and node B may be configured to renegotiate a connection every 15 seconds. Thus, based on this example, node B may initiate renegotiation of the connection 15 seconds after completion of the negotiation described above and illustrated in FIG. 4.

In some embodiments, each subsequent negotiation may use different generated keys than the preceding negotiation, different key lengths then the preceding negotiation, or a combination thereof. In such embodiments, the encryption algorithm used for generating the asymmetric keys, the asymmetric key length, the encryption algorithm used for generating the symmetric key, the symmetric key length, or any combination thereof may be different in each subsequent negotiation, or any combination thereof. Thus, it should be appreciated a number of different configurations may be used between any two nodes of the secure network system described herein. For example, in one embodiment only the generation of the symmetric key may use a different algorithm and different key length for each negotiation, while the generation of the public key and private key may use the same algorithm and key length for each negotiation. In other embodiments, for example, only the key length for the private key and public key and the key length for the symmetric key may be different in each negotiation, and the algorithms for generating the keys may remain the same in each negotiation.

FIGS. 5 and 6 depict two processes for sequential synchronization of a connection between nodes in accordance with an embodiment of the present invention. The processes are again described with reference to node A and node B. As mentioned above, an initial key generation, as shown in FIG. 5, may be performed in response to an initial negotiation of a connection between node A and node B. The process 500 depicted in FIG. 5 thus includes generating keys during an initial negotiation. Some or all steps of the process 500 may be implemented as executable computer code stored on a non-transitory tangible computer-readable storage medium and executed by one or more processors of a special-purpose machine, e.g., a computer programmed to execute the code.

After node A requests a synchronization with node B, node B may request a public key from node A (block 502). As shown in FIG. 5, node A has access to (e.g., via data stored in a memory of node A), a list 504 of algorithms for generation of the public key and private key (referred to as "asymmetric algorithms). For example, any number of asymmetric algorithms may be included in the list 504 (e.g., from a 1st asymmetric algorithm to an Nth asymmetric algorithm). Other nodes of the network may also include a similar list of asymmetric algorithms for generating public keys and private keys. For example, as shown in FIG. 5, node B may also include a list 506 of asymmetric algorithms. To generate a public key and private key, the next asymmetric algorithm may be selected from the list 504. Accordingly, after receiving the request for a public key from node B, node A may generate the public key and a private key using the 1st asymmetric algorithm and a 1st asymmetric key length (block 508). The public key is then transmitted to node B (block 510).

The encryption algorithms used for generating a public key and private key may include any number of suitable encryption algorithms. In some embodiments, the encryption algorithms may include the one or more of the following: RSA or DSA. Moreover, as mentioned above, any number and combination of these or other suitable encryption algorithms may be used as the lists 504 and 506 of asymmetric encryption algorithms.

Node B may also have access to (e.g., via data stored in a memory of node B) a list 512 of algorithms used for generating symmetric keys (referred to as "symmetric algorithms"). For example, any number of symmetric algorithms may be included in the list (e.g., from a 1st symmetric algorithm to an Nth symmetric algorithm). Other nodes of the network may also include a similar list of symmetric algorithms for generating symmetric keys. For example, as shown in FIG. 5, node A may also include a list 514 of symmetric algorithms. To generate a symmetric key, the next symmetric algorithm may be selected from the list 512. Accordingly, node B may receive the public key from node A and may generate a symmetric key using the 1st symmetric algorithm and a 1st symmetric key length (block 516).

The encryption algorithms used for generating a symmetric key may include any number of suitable encryption algorithms. In some embodiments, such encryption algorithms may include one or more of the following: DES, Triple DES, RC2, AES, or ASBE. Moreover, as mentioned above, any number and combination of these or other suitable encryption algorithms may be used as the lists 512 and 514 of symmetric encryption algorithms.

Next, as described above, the symmetric key may be encrypted using the public key and then may be transmitted to node B (block 518). Node A may receive the symmetric key (block 520) and then decrypt the symmetric key using the private key and the 1st asymmetric encryption algorithm. As also mentioned above, the symmetric key of the 1st symmetric algorithm may then be used by node A (e.g., block 524) and node B to encrypt and decrypt outbound and inbound data packets respectively. Additionally, a node may renegotiate a connection if certain renegotiation criteria are met. Thus, as shown in FIG. 5 for example, renegotiation criteria associated with node A may be evaluated to determine if the renegotiation criteria have been met (decision block 526). If the renegotiation criteria have not been met (line 528), node A may continue to use the symmetric key generating during the initial negotiation (line 524). If the renegotiation criteria have been met (line 530), then node A may request another negotiation, as illustrated in FIG. 6 and connection block A.

FIG. 6 illustrates a process 600 for synchronizing a connection between nodes in accordance with an embodiment of the present invention negotiation and that occurs after the initial negotiation illustrated in FIG. 5. Some or all steps of the process 600 may be implemented as executable computer code stored on a non-transitory tangible computer-readable storage medium and executed by one or more processors of a special-purpose machine, e.g., a computer programmed to execute the code. FIG. 6 is described with reference to node A as the initiator of the subsequent negotiation, although it should be appreciated that node B may also initiate a subsequent negotiation. After node A initiates a synchronization, node A may request a public key from node A (block 602). After receiving the request at node B, the public key and private key may be generated using the next asymmetric algorithm from the list 506 (block 604). Additionally, the key length of the generated private key and public key may be varied by using a 2nd asymmetric key length different than the 1st asymmetric key length used in the initial negotiation. In some embodiments, the asymmetric key lengths may be incremented from an initial key length to a final key length using a fixed increment value. For example, in one embodiment the initial asymmetric key length may be 384 bits, the final key length may be 512 bits, and the increment may be 8 bits. Thus, in such an embodiment the 1st asymmetric key length used in the initial negotiation may be 384 bits and the 2nd asymmetric key length used in the subsequent negotiation depicted in FIG. 6 may be 392 bits. Moreover, it should be appreciated that each node of a connection may start at a different initial key length. Thus, in a subsequent negotiation imitated by node B, the key length may be different than the key length used by node A in a previous negotiation. Accordingly, node B may generate a public key and private key using the next asymmetric algorithm, i.e., the 2nd asymmetric algorithm, and 2nd key length (block 604).

After generating the private key and public key, the public key is transmitted to node A (block 606). After receiving the public key, the next symmetric algorithm may be selected from the list 514 and the next the symmetric key may be generated using the selected symmetric algorithm. Additionally, the key length of the generated symmetric key may be varied by using a 2nd symmetric key length different than the 1st symmetric key length used in the initial negotiation. In some embodiments, the symmetric key length may be incremented from an initial key length to a final key length using a fixed increment value. For example, in one embodiment the initial symmetric key length may be 384 bits, the final symmetric key length may be 512 bits, and the increment may be 8 bits. In such an embodiment the 1st symmetric key length used in the initial negotiation may be 384 bits and the 2nd symmetric key length used in the subsequent negotiation depicted in FIG. 6 may be 392 bits. Moreover, it should be appreciated that each node of a connection may start at a different initial symmetric key length. Thus, in a subsequent negotiation imitated by node B, the symmetric key length may be different than the symmetric key length used by node A in a previous negotiation. Accordingly, node A generates a symmetric key using a 2nd symmetric algorithm and a 2nd symmetric key length (block 608).

After generating the symmetric key, the symmetric key may be encrypted using the public key (block 610), and the encrypted symmetric key may be sent to node B (block 612).

Node B may receive the encrypted symmetric key (block 614) and may decrypt the symmetric key using the private key of the 2nd asymmetric algorithm. As mentioned above, the symmetric may then be used by node A and node B to encrypt and decrypt outbound and inbound data packets respectively using the 2nd symmetric algorithm.

In this manner, two nodes that have a defined subscription may use different asymmetric algorithms, different asymmetric key lengths, different symmetric algorithms, different symmetric key lengths, or any combination thereof for secure communications after each negotiation. As each node maintains a list of asymmetric algorithms and symmetric algorithms, the nodes may each select the next algorithm in the list at each negotiation, ensuring that the nodes are using the same algorithms for secure communications after each negotiation. Moreover, when the end of a list of algorithms is reached, the next selection may use the first algorithm in the list and the selection sequence begins again. Similarly, when the maximum key length is reached, the next selection may use the initial key length and the key length increments may begin again.

Figure 7:
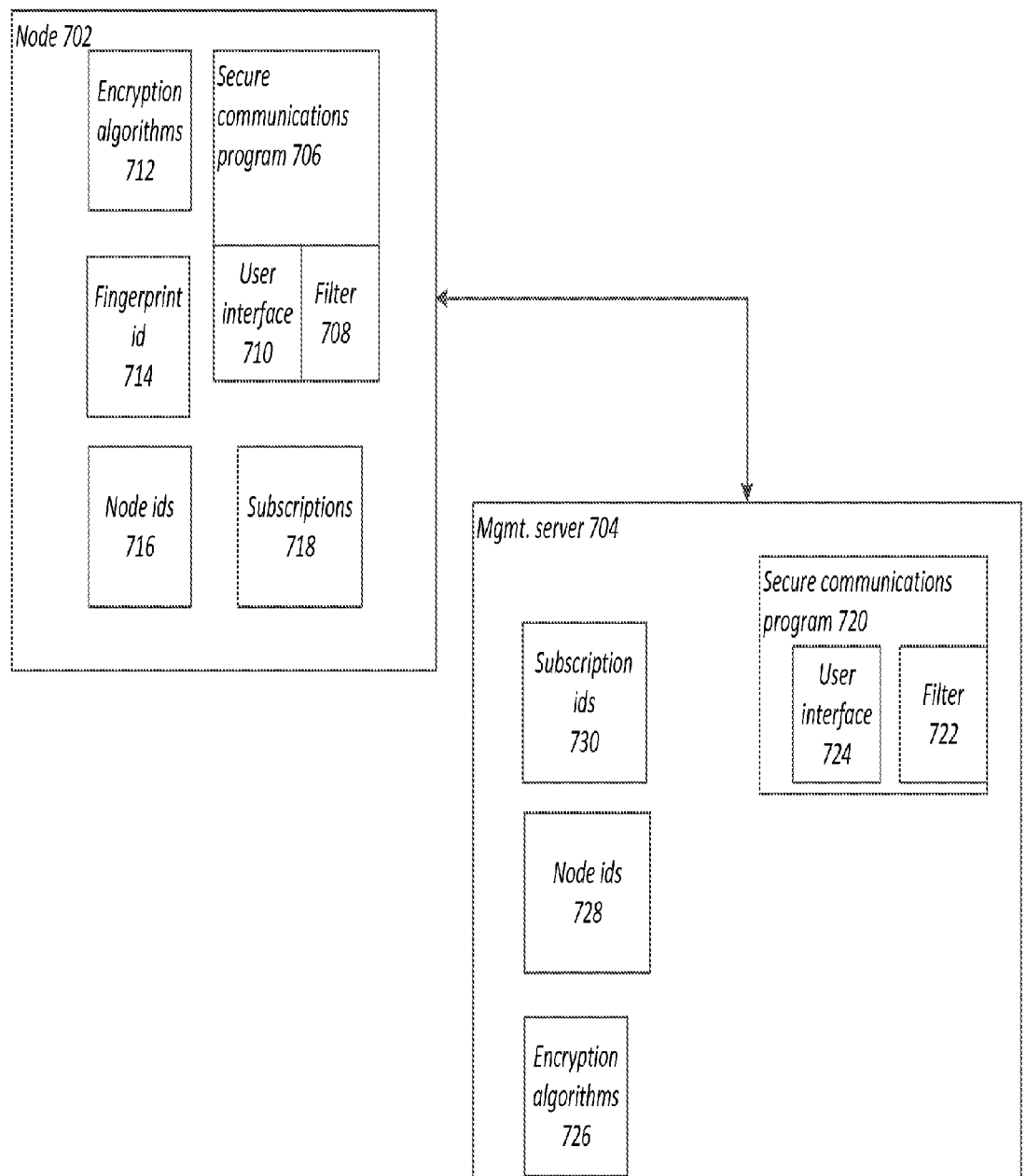
FIG. 7 is a block diagram of a node and a management server in accordance with an embodiment of the present invention.

FIG. 7 depicts a portion of a secure digital network system 700 that illustrates components of a node 702 and a management server 704. The node 702 may include a secure communications program 706 that provides the secure communication functionality described above. The secure communication program 706 may be implemented as a set of computer code instructions stored on a tangible non-transitory computer-readable media and executed by a process (e.g., one or more processors). In some embodiments, the secure communication program 706 may be stored on a memory and executed by a processer of the node 702. In other embodiments, the secure communication program 706 may be stored on a memory and executed by a processor of a discrete component coupled to the node 702 (e.g., a network interface card).

The secure communications program 706 may include a filter 708 and a user interface 710. The filter 708 may filter (i.e., block) inbound or outbound packets based on the subscriptions defined above and may also include the log functionality described above. Accordingly, in some embodiments the secure communications program 706 may write to and store a log file on a memory accessible by the program 706. In some embodiments, the log file stored on the node 702 is periodically sent to the management server 704. In some embodiments, the filter 708 of inbound and outbound communications may be implemented at the interface between the data link layer (layer 2) and the network layer (layer 3) of the OSI model. For example, in some embodiments the filtering may be implemented using the NDIS APL Consequently, the filter 708 may drop packets without any acknowledgement to a remote node that a packet was received, dropped, or otherwise processed. The user interface 710 may enable a user of the node 702 to configure the secure communications program 706 and view configurations and other data associated with the secure communications program 706. For example, the user interface may enable a user (e.g., an administrator) to view subscriptions associated with a node, configure subscriptions, add or remove encryption algorithms, and so on.

The node 702 also includes encryption algorithms 712, a fingerprint identifier 714, a node identifiers 716, and subscriptions 718. The encryption algorithms 712 may include encryption algorithms used for encrypting and decrypting communications via asymmetric keys and symmetric keys in the manner described above. Thus, in some embodiments the encryption algorithms may include a list of asymmetric algorithms, a list of symmetric algorithms, or both. The list of asymmetric algorithms and list of symmetric algorithms may be identical or may be different lists that may or may not include overlapping algorithms.

The identifiers 714 and 716 are used in determining subscriptions and authenticating connections, as described above. The fingerprint identifier 712 may be generated by the secure communications program 706 based on a hardware factor generated from a unique hardware configuration of the node 702. The node identifier 716 may be generated by the management server 704 using, for example, a secure communications program of the management server 704. The generated node identifier 716 may be sent to the node 702 for use in determining subscriptions with other nodes. Additionally, the node 702 includes subscriptions 716 (e.g., identified by subscription identifiers) that define subscription between the node 702 and other nodes. The subscriptions may also be defined using a secure communications program on the management server 704 and may be sent to the appropriate nodes. Advantageously, as the node 702 stores its own subscriptions, the node 702 may remain able to communicate with other nodes of the system 700 even if the management server 704 goes offline or is otherwise unavailable.

The management system 704 may also include a secure communications program 720. In some embodiments, the secure communications program 702 and secure communications program 720 are identical and may have different configurations for operation on the node 702 or the management server 704. In other embodiments, the secure communications program 720 may be different than the secure communications program 702 and may include different functionality, including a superset or subset, of the functionality provided by the secure communications program 702. The secure communications program 720 may also include a filter 722 and a user interface 724. The filter 722 may operate in a manner similar to the filter 708 described above. Thus, the filter 716 may filter inbound and outbound communications according to defined subscriptions with nodes of the network. As mentioned above, in some embodiments, the filter 716 of inbound and outbound communications may be implemented at the interface between the data link layer (layer 2) and the network layer (layer 3) of the OSI model. For example, in some embodiments the filtering may be implemented using the NDIS APL Consequently, the filter 716 may drop packets without any acknowledgement to a remote node that a packet was received, dropped, or otherwise processed. The user interface 724 may enable a user, e.g., an administrator, to configure the management server 704 and other elements of the system 700. For example, the user may use the user interface to generate node identifiers, define subscriptions between nodes (e.g., between the management server 704 and the node 702), remove subscriptions, remove nodes, and so on.

The management server 704 may also include (e.g., stored on a memory of the management server 704) encryption algorithms 726, node identifiers 728, and subscriptions 730. As mentioned above, the encryption algorithms 726 may include encryption algorithms used for encrypting and decrypting communications via asymmetric keys and symmetric keys in the manner described above and may include a list of asymmetric algorithms, a list of symmetric algorithms, or both. The list of asymmetric algorithms and list of symmetric algorithms may be identical or may be different lists that may or may not include overlapping algorithms. Moreover, the encryption algorithms 726 stored on the management server 704 may provide a central location for algorithms used the secure communications of the system 100. Thus, in some embodiments, the encryption algorithms 726 stored on the management server 704 may be provided to the nodes (e.g., node 702) of the system 700 for use in synchronization and secure communications.

As mentioned above, the management server 704 also includes node identifiers 728 and subscriptions 730. The node identifiers 728 and subscriptions 730 may be stored in any suitable data structure, such as a relational database, an XML file, or other data structures. The node identifiers 728 may include identifier for each node of the system 700 and may be generated by the management server 704 using the secure communications program 720. For example, in some embodiments a user, e.g., an administrator, may use the secure communications program 720 to generate node identifiers for each desired node of the system 700. The generated node identifier 728 may be sent to the nodes of the network 700 for use in determining subscriptions with other nodes.

The subscriptions 728 may be defined using the secure communications program 720 on the management server 704. For example, a user, e.g., an administrator, may use the secure communications program 720 to define subscriptions between nodes of the system 700. As described above, a subscription defines a relationship between two nodes to enable secure communications between the nodes. Without a subscription, the nodes of the system 700. As mentioned above, the subscriptions defined for a node may also be stored on the node itself. Thus, if the management server 704 becomes offline or otherwise unavailable, the node may continue to securely communicate using any previously defined subscriptions. Additionally, if a node is suspected to be comprised or is removed from the network, any subscriptions between that node and other nodes of the network may be removed by the secure communications program 720. Moreover, it should be appreciated that node activity may be automatically monitored and flagged by analysis of logs sent to the management server 704. For example, the secure communications program 720 may include a monitoring process that automatically monitors logs from each node of the system 700. Node activity that may be flagged may include, for example, a node periodically attempting to send communications to another node for which there is no defined subscription.

Figure 8:
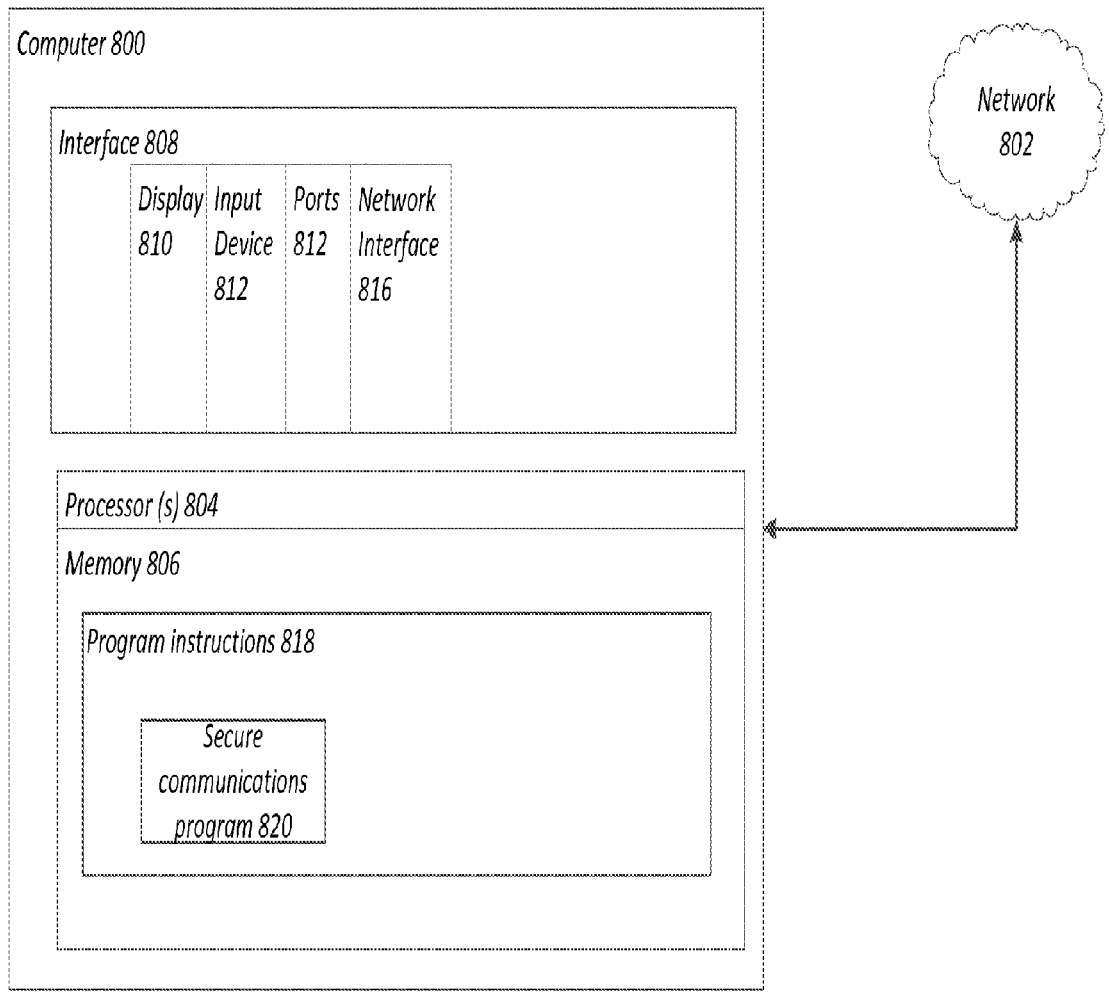
FIG. 8 is a block diagram of a computer in accordance with an embodiment of the present invention.

FIG. 8 depicts a computer 800, e.g., a node or a management server of a secure network system, in accordance with an embodiment of the present invention. The computer depicted in FIG. 8, and other computers providing comparable capabilities, may be used in conjunction with the present techniques. The computer 800 may communicate over a network 802, described further below. The computer 800 may include various internal and external components that contribute to the function of the device and which may allow the computer 800 to function in accordance with the techniques discussed herein. As will be appreciated, various components of computer 800 may be provided as internal or integral components of the computer 800 or may be provided as external or connectable components. It should further be noted that FIG. 8 depicts merely one example of a particular implementation and is intended to illustrate the types of components and functionalities that may be present in computer 800.

In various embodiments, the computer 800 may be a server, a desktop computer, a laptop computer, a tablet computer, a smartphone, or other types of computers. As shown in FIG. 8, the computer 800 may include one or more processors 804 and memory 806. Additionally, the computer 800 may include, for example, an interface 808, a display 810, an input device 812, input/output ports 814 and a network interface 816.

The display 810 may include a cathode ray tube (CRT) display, a liquid crystal display (LCD), an organic light emitting diode (OLED) display, or other types of displays. The display 810 may display a user interface (e.g., a graphical user interface) and may display various function and system indicators to provide feedback to a user, such as power status, call status, memory status, etc. In some embodiments, the display 810 may include a touch-sensitive display (referred to as a "touch screen). In such embodiments, the touch screen may enable interaction with the computer via a user interface displayed on the display 810. In some embodiments, the display 810 may display a user interface for implementing the techniques described above, such as, for example, creating subscriptions, generating node identifiers, removing subscriptions, removing node identifiers, viewing logs, and so forth.

The one or more processors 804 may provide the processing capability required to execute the operating system, programs, user interface, and functions of the computer 800. The one or more processors 800 may include microprocessors, such as "general-purpose" microprocessors, a combination of general and special purpose microprocessors, and Application-Specific Integrated Circuits (ASICs). The computer 800 may thus be a single processor system or a multiple processor system. The one or more processors 800 may include single-core processors and multicore processors and may include graphics processors, video processors, and/or related chip sets.

The memory 806 may be accessible by the processor 802 and other components of the computer 800. The memory 806 (which may include tangible non-transitory computer readable storage mediums) may include volatile memory and non-volatile memory accessible by the processor 802 and other components of the computer 800. The memory 806 may store a variety of information and may be used for a variety of purposes. For example, the memory 806 may store the firmware for the computer 800, an operating system for the computer 800, and any other programs or executable code necessary for the computer 800 to function. The memory 806 may include volatile memory, such as random access memory (RAM) and may also include non-volatile memory, such as ROM, a solid state drive (SSD), a hard drive, any other suitable optical, magnetic, or solid-state storage medium, or a combination thereof.

The memory may store executable computer code that includes program instructions 818 executable by the one or more processors 802 to implement one or more embodiments of the present invention. For example, the processes 100, 200, and 300 described above may be implemented in program instructions 818. The program instructions 818 may include a computer program (which in certain forms is known as a program, software, software application, script, or code). Thus, in some embodiments program instructions 818 may include instructions 820 for a secure communications program. A computer program may be written in a programming language, including compiled or interpreted languages, or declarative or procedural languages. A computer program may include a unit suitable for use in a computing environment, including as a stand-alone program, a module, a component, a subroutine, etc., that may or may not correspond to a file in a file system. The program instructions 818 may be deployed to be executed on computers located locally at one site or distributed across multiple remote sites and interconnected by a communication network (e.g., network 802).

The interface 808 may include multiple interfaces and may couple various components of the computer 800 to the processor 802 and memory 804. In some embodiments, the interface 808, the processor 802, memory 804, and one or more other components of the computer 800 may be implemented on a single chip. In other embodiments, these components and/or their functionalities may be implemented on separate chips.

The computer 800 also includes a user input device 812 that may be used to interact with and control the computer 800. In general, embodiments of the computer 800 may include any number of user input devices 812, such as a keyboard, a mouse, a trackball, a digital stylus or pen, buttons, switches, or any other suitable input device. The input device 812 may be operable with a user interface displayed on the computer 800 to control functions of the computer 800 or of other devices connected to or used by the computer 800. For example, the input device 800 may allow a user to navigate a user interface, input data to the computer 800, select data provided by the computer 800, and direct the output of data from the computer 800.

The computer 800 may also include an input and output port 814 to enable connection of devices to the computer 800. The input and output 814 may include an audio port, universal serial bus (USB) ports, AC and DC power connectors, serial data ports, and so on. Further, the computer 800 may use the input and output ports to connect to and send or receive data with other devices, such as other computers, printers, and so on.

The computer 800 depicted in FIG. 8 also includes a network interface 816, such as a network interface card (NIC), wireless (e.g., radio frequency) receivers, etc. For example, the network interface 816 may include known circuitry for communicating with communication networks via electromagnetic signals transmitted over a wired or wireless connection. Such circuitry may include, for example, antennas, amplifiers, transceivers, receivers, processors, and so on. The network interface 816 may communicate with various communication networks (e.g., network 802), such as the Internet, an intranet, a cellular telephone network, a wireless local area network (LAN) a metropolitan area network (MAN), or other suitable communication networks. The network interface 816 may implement any suitable communications standard, protocol and/or technology, including wired Ethernet, wireless Ethernet (Wi-Fi) ((e.g., IEEE 802.11a, IEEE 802.11b, IEEE 802.11g and/or IEEE 802.11n), a 3G network (e.g., based upon the IMT-2000 standard), high-speed downlink packet access (HS-DPA), wideband code division multiple access (W-CDMA), code division multiple access (CDMA), time division multiple access (TDMA), a 4G network (e.g., IMT Advanced, Long-Term Evolution Advanced (LTE Advanced), etc.), and any other suitable communications standard, protocol, or technology.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for secure communications on a digital network, comprising:
  receiving, at a processor, a first packet at a first node of a network;
  determining, by a processor, whether a subscription exists between the first node and a second node associated with the packet;
  performing, by the processor, an authentication of a connection between the first node and the second node in response to determining the subscription exists, the authentication comprising:
    sending a unique identifier from the first node to the second node, the unique identifier comprising a fingerprint identifier associated with the first node;
  performing, by the processor, a first synchronization of the connection between the first node and the second node, the first synchronization comprising:
    receiving a first request from the second node for a first asymmetric public key;

generating a first asymmetric public key and a first asymmetric private key each having a first asymmetric key length using a first encryption algorithm;

sending the first asymmetric public key to the second node;

receiving an encrypted first symmetric key from the second node, the first symmetric key encrypted using the first asymmetric public key and the first symmetric key generated using a second encryption algorithm; and decrypting the first encrypted symmetric key to obtain the first symmetric key;

encrypting data of the first packet using the first symmetric key;

sending, over the network, the first packet to the second node;

performing, by the processor, a second synchronization of the connection between the first node and the second node in response to determining the subscription exists, the second synchronization comprising:

receiving a second request from the second node for a second asymmetric public key;

generating a second asymmetric public key and a second asymmetric private key each having a second asymmetric key length using a third encryption algorithm, the third encryption algorithm being different from the first encryption algorithm;

sending the second asymmetric public key to the second node;

receiving an encrypted second symmetric key from the second node, the second symmetric key encrypted using the first asymmetric public key;

decrypting the encrypted second symmetric key to obtain a second symmetric key; and encrypting data of a second packet using the symmetric key.

2. The computer-implemented method of claim 1, comprising sending, over the network, the second packet to the second node.

3. The computer-implemented method of claim 1, wherein the fingerprint identifier is generated based on a hardware factor generated from a hardware configuration of the first node.

4. The computer-implemented method of claim 1, wherein the authentication comprises:

sending a second unique identifier from the second node to the first node, the unique identifier comprising a node identifier associated with the second node, a fingerprint identifier associated with the second node, and a subscription identifier associated with the subscription.

5. The computer-implemented method of claim 1, wherein the first node comprises a desktop computer, a laptop computer, a smartphone, or a tablet computer and the second node comprises a desktop computer, a laptop computer, a smartphone, or a tablet computer.

6. The computer-implemented method of claim 1, wherein the network uses the Transmission Control Protocol (TCP) and Internet Protocol (IP).

7. The computer-implemented method of claim 1, comprising dropping the packet if no subscription exists by dropping the packet at a data link layer of the network.

8. The computer-implemented method of claim 1, wherein generating a second asymmetric public key comprises adding an increment to a first asymmetric key length to obtain a second asymmetric key length.

9. The computer-implemented method of claim 1, wherein performing a second synchronization of the connection between the first node and the second node comprises selecting the third encryption from a list of encryption algorithms stored in a tangible non-transitory memory of the first node.

10. A non-transitory tangible computer-readable storage medium having executable computer code stored thereon for secure communications on a digital network, the computer code comprising a set of instructions that causes one or more processors to perform the following operations:

receiving, at a processor, a first packet at a first node of a network;

determining, by a processor, whether a subscription exists between the first node and a second node associated with the packet;

performing, by a processor, an authentication of a connection between the first node and the second node in response to determining the subscription exists, the authentication comprising:

sending a unique identifier from the first node to the second node, the unique identifier comprising a fingerprint identifier associated with the first node;

performing, by a processor, a first synchronization of the connection between the first node and the second node, the first synchronization comprising:

receiving a first request from the second node for a first asymmetric public key;

generating a first asymmetric public key and a first asymmetric private key using a first encryption algorithm;

sending the first asymmetric public key to the second node;

receiving an encrypted first symmetric key from the second node, the first symmetric key encrypted using the first asymmetric public key and the first symmetric key generated using a second encryption algorithm; and decrypting the first encrypted symmetric key to obtain the first symmetric key;

encrypting data of the first packet using the first symmetric key;

sending, over the network, the first packet to the second node;

performing, by a processor, a second synchronization of the connection between the first node and the second node if the subscription exists, the second synchronization comprising:

receiving a second request from the second node for a second asymmetric public key;

generating a second asymmetric public key and a second asymmetric private key each having a second asymmetric key length using a third encryption algorithm, the third encryption algorithm being different from the first encryption algorithm;

sending the second asymmetric public key to the second node;

receiving an encrypted second symmetric key from the second node, the second symmetric key encrypted using the first asymmetric public key and the second symmetric key using a fourth encryption algorithm, the fourth encryption algorithm being different from the second encryption algorithm;

decrypting the encrypted second symmetric key to obtain a second symmetric key; and encrypting data of a second packet using the symmetric key.

11. The non-transitory tangible computer-readable storage medium of claim 10, the computer code comprising a set of instructions that causes one or more processors to perform the following operations: sending, over the network, the second packet to the second node.

12. The non-transitory tangible computer-readable storage medium of claim 10, wherein the fingerprint identifier is generated based on a hardware factor generated from a hardware configuration of the first node.

13. The non-transitory tangible computer-readable storage medium of claim 10, wherein the first node comprises a desktop computer, a laptop computer, a smartphone, or a tablet computer and the second node comprises a desktop computer, a laptop computer, a smartphone, or a tablet computer.

14. The non-transitory tangible computer-readable storage medium of claim 10, wherein the network uses the Transmission Control Protocol (TCP) and Internet Protocol (IP).

15. The non-transitory tangible computer-readable storage medium of claim 10, comprising dropping the packet if no subscription exists by dropping the packet at a data link layer of the network.

16. The non-transitory tangible computer-readable storage medium of claim 10, wherein generating a second asymmetric public key and a second asymmetric private key comprises adding an increment to a first asymmetric key length to obtain a second asymmetric key length.

17. The non-transitory tangible computer-readable storage medium of claim 10, wherein performing a second synchronization of the connection between the first node and the second node comprises selecting the third encryption from a list of encryption algorithms stored in a tangible non-transitory memory of the first node.

\* \* \* \* \*